(No Model.) 2 Sheets—Sheet 1.
H. C. REAGAN, Jr.
MAGNETIC PATH FOR UNDERGROUND ELECTRIC RAILWAYS.
No. 570,566. Patented Nov. 3, 1896.
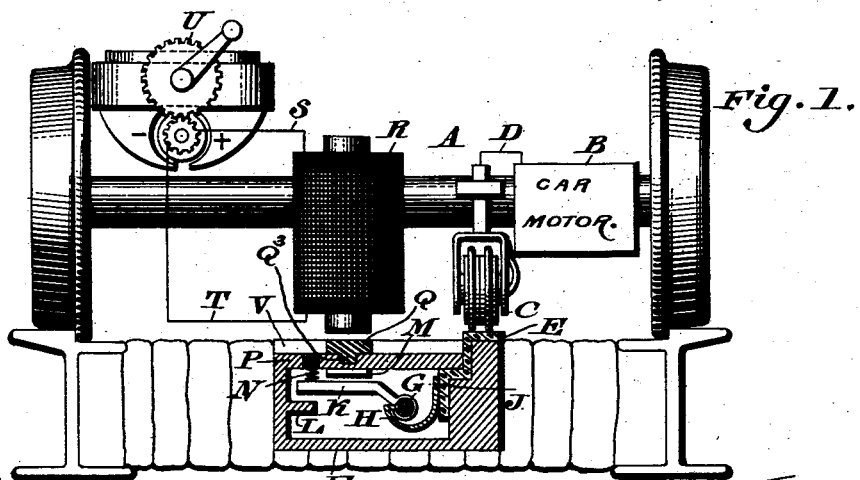
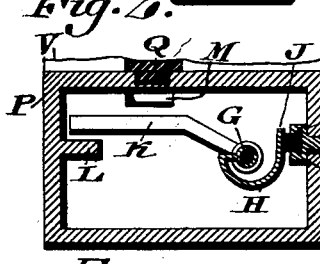
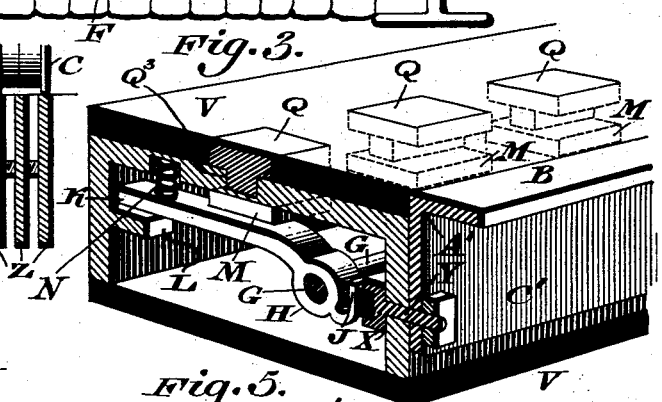
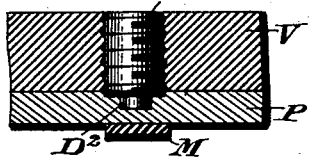
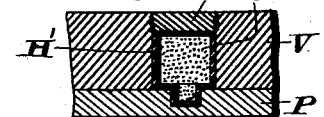
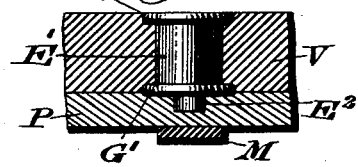
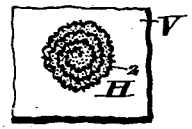
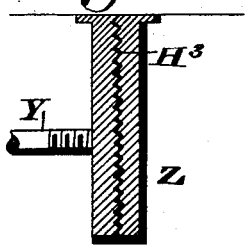
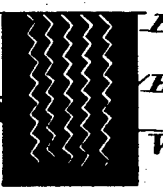
WITNESSES:
P. T. Sagle.
E. H. Fairbanks
INVENTOR
Harry C. Reagan Jr.
BY
[signature]
ATTORNEY.

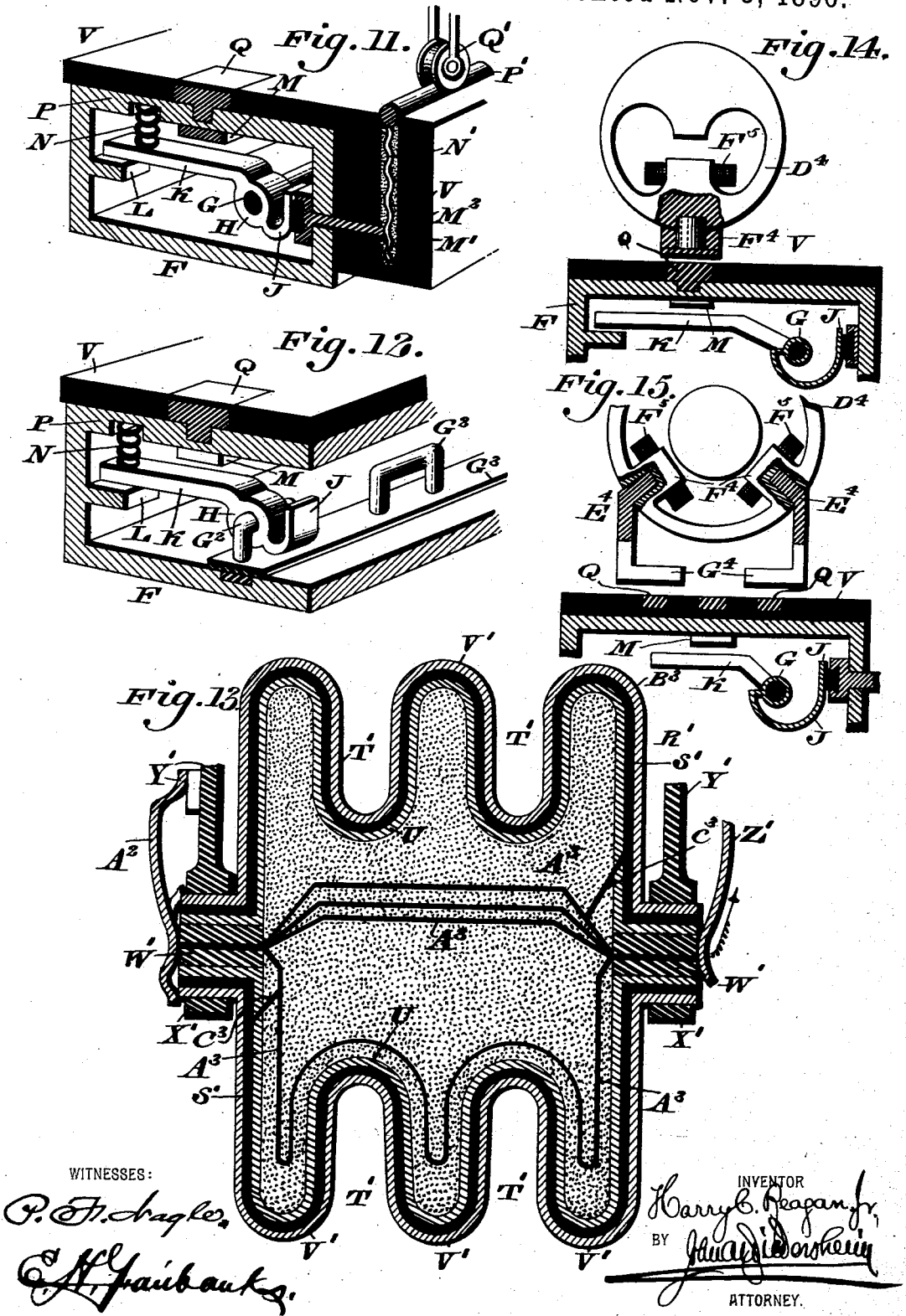

UNITED STATES PATENT OFFICE.

HARRY C. REAGAN, JR., OF PHILADELPHIA, PENNSYLVANIA.

MAGNETIC PATH FOR UNDERGROUND ELECTRIC RAILWAYS.

SPECIFICATION forming part of Letters Patent No. 570,566, dated November 3, 1896.

Application filed April 21, 1896. Serial No. 588,470. (No model.)

*To all whom it may concern:*

Be it known that I, HARRY C. REAGAN, Jr., a citizen of the United States, residing in the city and county of Philadelphia, State of Pennsylvania, have invented a new and useful Improvement in Means for Producing a Magnetic Path for Underground Railways, which improvement is fully set forth in the following specification and accompanying drawings.

In prior patents granted to me I have shown and described a novel construction of underground railway in which a feed-wire having an oscillatory contact mounted thereupon is employed, provision being further made for causing said oscillatory contacts to be actuated through the medium of a suitable magnet carried on the car, the path for the lines of force from said magnet to the oscillatory contacts within said conduit being through the top of the latter.

I have found by experience that in order to attain the most economical and effective device for producing a path for the lines of force through the top of the conduit the resistance to the flow of said lines of force between the magnet-poles and the contact devices must be decreased or reduced to a minimum; and to this end my invention consists of a novel construction of blocks or plugs or equivalent devices which are embedded in the top of the conduit and surrounded by the asphaltum or similar paving material, conducting-plates being arranged within the conduit in proximity to the contact devices under said blocks, the number of said plates corresponding in the present instance to the number of oscillatory contact devices employed.

The invention also consists of a novel construction of collector-wheel employed, the latter being provided with devices for causing it to become highly heated and being thus adapted to melt any snow or ice which may tend to accumulate upon the conductor.

It further consists of novel details of construction, all as will be hereinafter fully set forth, and specifically pointed out in the claims.

Figure 1 represents a transverse sectional view of an underground electric railway, showing one form of the device employed for producing a magnetic path for the lines of force from the exterior to the interior of the conduit. Fig. 2 represents a sectional view of a portion of an underground electric railway, showing a modified construction of devices for producing said path for the magnetic lines and for conducting electricity to the collector-wheel. Fig. 3 represents a further modification showing an underground conduit closed at its top and sides and resting upon a base of concrete, asphaltum, or similar material. Figs. 4, 5, and 6 represent other constructions of devices for producing a magnetic path from the exterior to the interior of the conduit. Figs. 7 and 8 represent detail views showing conductor-bolts employed, having carbon buttons in the heads thereof for the purpose of making an effective electrical connection. Fig. 9 represents a sectional view showing a portion of the conductor for the electric fluid which is embedded in the asphaltum or paving material, said conductor conveying said fluid to the collector-wheel employed. Fig. $9^\times$ represents a carbon plate similar to the ones seen in Fig. 2, but provided with a corrugated strengthening-strip, which may be copper wire or perforated sheet metal. Fig. 10 represents a magnetic path composed of a wire screen or its equivalent wound into the form of a coil, the latter being embedded in or surrounded by the paving material. Fig. 11 represents a perspective view showing a modified construction of the device for conducting electricity to a cylindrical conductor at the exterior of the conduit. Fig. 12 represents a modified construction of the feeder and devices for mounting the oscillatory contacts thereupon. Fig. 13 represents a sectional view of a novel construction of collector-wheel employed, showing the novel means for heating the same, so as to melt ice or snow which may accumulate upon the conductor. Figs. 14 and 15 represent detached views showing means for inducing the magnetic current without necessitating the employment of a separate magnet.

Similar letters of reference indicate corresponding parts in the several figures.

Referring to the drawings, A designates a portion of the running-gear of a car, the same consisting of the car-motor B, the collector-wheel C, having a connection D intermediate it and said motor, and the conductor E, serving to assist in conveying electricity from the feed-wire G, mounted within the conduit F, to said collector-wheel C.

H designates an oscillatory contact employed, which is mounted on said feed-wire G and consists of the resilient member J and the magnetic member K, which is adapted to normally rest on the abutment L, the positive downward movement of said member K and consequent opening of the circuit to the conductor E being assured through the medium of the spring N.

M designates short plates or strips which are attached to the under side of the top P of the conduit F, which latter it will be understood is to be of non-conducting material, said top having embedded therein the blocks Q, of iron or other suitable material, which have, preferably, a tongue $Q^3$, which projects a short distance into the top P, it being, however, noted that said tongue $Q^3$ does not project through said top P, but terminates a short distance from the plates or strips M, said blocks being surrounded or embedded in the asphaltum or other paving material V. R designates a magnet which is mounted on the car and is adapted to travel over said blocks Q, said magnet having suitable connections S and T leading to a hand-motor U, the function of which is described in a contemporaneously-pending application filed by me and does not require further description here.

In the construction seen in Fig. 2 the electricity is conducted from the resilient member J to a carbon button W, which is suitably secured in the head X of the bolt Y, the latter being screwed into the carbon plates Z, upon which the collector-wheel C is adapted to travel and contact, and thus remove electricity therefrom to the car-motor B, which is omitted from Fig. 2, said plates being strengthened, if desired, by means of the corrugated plate or plates $H^3$, as seen in Fig. $9^\times$.

In analogous manner, as seen in Fig. 3, the electricity is conducted from the feed-wire through the resilient member J of the contact H to the bolt Y, and thence to the member C' of the angle-iron A', the same having a lateral flange or tread B', upon which the collector-wheel C is adapted to travel, the operation of the other parts being the same as already referred to, the collector-wheel, magnet, &c., being omitted for the sake of clearness of illustration.

In Fig. 4 I have shown a threaded plug D' embedded in the asphaltum V, the same having an extension $D^2$, which terminates near the plate M, said plug serving as a path for the lines of force and having the same function as the blocks Q.

In Fig. 6 a spool E' is shown embedded in the asphaltum V, the same having the flanges F' G', which serve to hold it in position, the boss $E^2$ of said spool terminating a short distance from the plate or strip M.

In like analogy in Fig. 5 I have shown a tube or cup H' inserted in the asphaltum V, which extends a short distance into the top P of the conduit, so as to terminate near the plate or strip M, said cup being filled with iron filings J', which are held in position by means of the iron cap K'.

In Fig. 9 I have shown a number of corrugated plates or wire screens $H^4$ embedded in the asphaltum V, which serve the same function as the carbon plates Z.

In Fig. 10 I have shown a section of wire screen $H^2$ wound into helical shape and embedded in the asphaltum, the same having the same function as the devices seen in Figs. 4 to 6.

In Fig. 11 electricity is conducted from the feed-wire G to the sheet-metal strip N', which may be corrugated, if desired, and inclosed in a suitable casing M', which is filled with powdered coke or carbon $M^2$, the top of said plate N' being connected to a cylindrical conductor P', upon which the grooved collector-wheel Q' is adapted to run, the electricity being taken therefrom to the car-motor in the manner described with reference to Fig. 1.

In Fig. 12 I have shown a modified manner of mounting the contacts H, the feeder $G^3$ being in the present instance a flat strip embedded in the base of the conduit, into which the staples or equivalent devices $G^2$ are inserted, upon which the contacts H are mounted.

In Fig. 13 I show a novel construction of collector-wheel R', the same consisting of the body portion S', which is made of suitable non-conducting material, as glass or porcelain, which may be provided with corrugations T', the inner surface of said glass or other non-conducting wheel S' having a coating U', of silver or other material of high resistance, and having surrounding it a metal shell V' to take up wear and collect the current.

W' designates the hubs of the wheel, which rotate in suitable bearings X', which are attached to the yoke Y', which may lead to the car-motor B in substantially the manner indicated in Fig. 1.

$A^2$ designates contact-strips, which convey the current in and out, respectively, of the hubs W', said current passing from the wheel through the strip $A^2$, thence through the hubs W' and through the wires $A^3$, which are embedded in asbestos $B^3$, contained within the glass or porcelain wheel S', said wires having connections $C^3$ leading therefrom to the silver casing or coating U and thereby serving to highly heat the said collector-wheel R', as is evident, it being noted that said wheel in its travel when highly heated will melt any accumulation of ice or snow upon the conductor P' or other equivalent, the electricity passing out through the strips Z' to the motor, it being understood that the upper portion of the yoke Y' is properly insulated.

The function of the devices employed for the production of the magnetic path—viz., Q, D', E', and H'—will, it is thought, be apparent without any further description.

Especial attention is called to the construction seen in Fig. 3, in which a three-sided conduit is employed resting on the asphaltum, whereby the construction is greatly cheapened and simplified, and since the top and bottom are of hermetically-sealed non-conducting material it will be evident that no moisture can gain access to the interior of said conduit.

In Figs. 14 and 15 I show devices for dispensing with the extra magnet R seen on the car, as in Fig. 1, the current that excites the car-motor fields being utilized instead of a separate magnet R.

In Figs. 14 and 15, $D^4$ designates the motor-casing, and $E^4$ the poles inserted in the motor-poles $F^4$, the latter having the windings $F^5$, a two-pole motor being shown in Fig. 14 and a four-pole motor in Fig. 15. In the latter figure the pole-pieces $E^4$ may be of steel or iron and have attached to them soft-iron shoes $G^4$, which effectively serve to direct the lines of force through the blocks in the asphaltum or other paving material.

The above construction is applicable to a two-pole or four-pole motor, it being evident that when the current is passing around the field-poles a portion of the lines of force will travel through the supplemental poles placed in the motor-field poles, and when desired I also wish to attach the small generator to the field-winding to excite the poles when the main current is cut off.

Having thus described my invention, what I claim as new, and desire to secure by Letters Patent, is—

1. In an underground railway, a conduit containing a plurality of contacting devices, suitable protecting or paving material adapted to cover the top of said conduit, a series of independent magnetic paths, separated from each other and embedded in said material, and extending from the surface thereof toward but not into the interior of said conduit and over said contacting devices, and said magnetic paths being out of electrical connection with the interior of the conduit.

2. In an underground railway, a closed non-conducting conduit, and a series of blocks located above the same, and embedded in the top of the paving material, covering said conduit, in combination with a series of plates or strips suitably attached to the under side of the top of the conduit, and means for conducting electricity from the feed-wire within said conduit to the exterior of the latter.

3. In an electric railway, a three-sided conduit adapted to rest upon and be embedded in a paving material, a series of blocks embedded in the top of said conduit, a series of plates attached to the interior of the latter, a bolt projecting through a side of said conduit and having a carbon button in its head, and an angle-iron secured to a side of said conduit, said bolt serving as a conductor of electricity, and to hold said angle-iron in position.

4. In an electric railway, a collector-wheel consisting of an inner glass or non-conducting shell, a coating of silver thereupon, a metallic shell surrounding the whole, coils of high resistance embedded in asbestos contained within said non-conducting shell, and means for conducting electricity to and from said coils.

5. In an electric railway, a conduit, a feed-wire supported therein, oscillatory contact devices mounted on said feed-wire, means for conducting electricity from said devices to a car-motor, and paving material covering the top of said conduit, in combination with a series of independent magnetic paths separated from each other and embedded in said paving material, and extending from the surface thereof toward, but not into, the interior of said conduit, said paths being located over said contacting devices and being out of electrical connection with the interior of the conduit.

6. In an electric railway, a non-conducting conduit having its sides and top hermetically joined to each other, a feed-wire, a contact having an oscillatory resilient arm mounted thereon, a series of plates attached to the top of said conduit, a series of blocks located in the top of said conduit over said plates, an angle-iron located adjacent a side of said conduit, a bolt having a carbon button in its head common to a side of said conduit and a limb of said angle-iron, means for holding said bolt in position, and devices for magnetically operating said contact.

7. In an electric railway, a conduit, a feed-wire supported therein, oscillatory contact devices mounted on said feed-wire, paving material covering the top of said conduit and a series of independent magnetic paths, embedded in said paving material, and extending from the surface thereof toward, but not into, the interior of said conduit, said paths being located over said contacting devices and out of electrical connection with the interior of the conduit, in combination with a car-motor, and supplemental poles provided with soft-iron shoes inserted in the poles of said car-motor, said shoes being adapted to travel over said magnet paths.

8. In an electric railway, a feed-wire, a conduit therefor, an oscillatory contact mounted on said feed-wire, means for conducting electricity from said contact to the car-motor, a series of supplemental poles inserted in the poles of the car-motor, shoes of soft iron attached to said poles, and devices for producing a magnetic path to the interior of the conduit located in the path of said poles.

9. The herein-described collector-wheel, consisting of a glass, porcelain or other non-conducting shell, coated interiorly with silver, a metal shell surrounding said glass or non-conducting shell, the interior of said wheel being filled with asbestos, and having a series of coils of wire of high resistance embedded in said abestos, and means for conducting electricity to said wires.

10. In an electric railway, a conduit, a casing therefor, a series of independent magnetic paths, supported above said conduit, and a magnet having soft-iron shoes attached to each pole thereof, said shoes extending over one or more magnetic paths.

HARRY C. REAGAN, Jr.

Witnesses:
JOHN A. WIEDERSHEIM,
E. H. FAIRBANKS.